United States Patent [19]
DeLuca et al.

[11] Patent Number: 5,146,216
[45] Date of Patent: Sep. 8, 1992

[54] MULTIPLE MESSAGE SIGNALLING PROTOCOL FOR A SELECTIVE CALL RECEIVER

[75] Inventors: Michael J. DeLuca; Joan S. DeLuca, both of Boca Raton, Fla.

[73] Assignee: Motorola, Inc., Schaumburg, Ill.

[21] Appl. No.: 697,508

[22] Filed: May 3, 1991

Related U.S. Application Data

[63] Continuation of Ser. No. 450,798, Dec. 14, 1989, abandoned.

[51] Int. Cl.$^5$ .................................................. H04B 7/00
[52] U.S. Cl. ............................ 340/825.52; 340/311.1; 340/825.27; 340/825.44
[58] Field of Search ............ 340/311.1, 825.24, 825.27, 340/825.44, 825.47, 825.48, 825.52

[56] References Cited

U.S. PATENT DOCUMENTS

| | | | |
|---|---|---|---|
| 4,646,081 | 2/1987 | Tsunoda | 340/311.1 |
| 4,713,808 | 12/1987 | Gaskill et al. | 340/825.44 |
| 4,766,434 | 8/1988 | Matai et al. | 340/311.1 |
| 4,870,402 | 9/1989 | DeLuca et al. | 340/311.1 |
| 4,873,519 | 10/1989 | Matai et al. | 340/311.1 |
| 4,922,221 | 5/1990 | Sato et al. | 340/311.1 |
| 5,087,905 | 2/1992 | Kuramatsu et al. | 340/311.1 |

FOREIGN PATENT DOCUMENTS

| | | | |
|---|---|---|---|
| 0189089 | 7/1986 | European Pat. Off. | 340/825.44 |
| 0317230 | 5/1989 | European Pat. Off. | 340/311.1 |
| 0076631 | 4/1988 | Japan | 340/311.1 |
| WO88/09104 | 11/1988 | World Int. Prop. O. | 340/825.27 |

*Primary Examiner*—Donald J. Yusko
*Assistant Examiner*—Dervis Magistre
*Attorney, Agent, or Firm*—William E. Koch; Vincent B. Ingrassia

[57] ABSTRACT

A selective call receiver comprises circuitry for receiving a first signal having a first address and a first information format, and a second signal having a second address and a second information format; and a device for presenting a message comprising the first and second information formats. The information formats may comprise any of, for example, numeric, alphanumeric, and graphic displays and a voice output.

21 Claims, 2 Drawing Sheets

ALPHANUMERIC

| PREAMBLE | CODE | $A_A$ | $M_A$ | $CC_1$ | $M_A$ | $CC_2$ | $M_A$ | $CC_3$ | $M_A$ | $CC_4$ |
|---|---|---|---|---|---|---|---|---|---|---|

VOICE

| PREAMBLE | CODE | $A_V$ | $CC_1$ | $M_V$ |
|---|---|---|---|---|

NUMERIC

| PREAMBLE | CODE | $A_N$ | $CC_2$ | $M_{N1}$ | $CC_3$ | $M_{N2}$ |
|---|---|---|---|---|---|---|

GRAPHIC

| PREAMBLE | CODE | $A_G$ | $CC_4$ | $M_G$ |
|---|---|---|---|---|

FIGURE 2

ALPHANUMERIC

| PREAMBLE | CODE | $A_A$ | $M_A$ | $CC_1$ | $CC_2$ | $M_A$ | $CC_3$ | $M_A$ | $CC_4$ |

VOICE

| PREAMBLE | CODE | $A_V$ | $CC_1$ | $M_V$ |

NUMERIC

| PREAMBLE | CODE | $A_N$ | $CC_2$ | $M_{N1}$ | $CC_3$ | $M_{N2}$ |

GRAPHIC

| PREAMBLE | CODE | $A_G$ | $CC_4$ | $M_G$ |

MULTIPLE MESSAGE SIGNALLING PROTOCOL FOR A SELECTIVE CALL RECEIVER

This is a continuation of application Ser. No. 07/450,798, filed Dec. 14, 1989, now abandoned.

FIELD OF THE INVENTION

This invention relates in general to selective call receivers and more specifically to a method of combining two or more selective call receiver transmissions having two or more information formats which may include, for example, numeric, alphanumeric, graphic and voice.

BACKGROUND OF THE INVENTION

Several protocols have been designed for transferring messages to selective call receivers. These protocols include POCSAG (Great Britain's Post Office Code Standardization Advisory Group) and GSC (Golay Sequential Code). A message comprises an address if the message is a "tone only" message, or an address and information if the message is a data message. The information in a data message conventionally comprised one of several information formats including numeric (transmitted by BCD), alphanumeric (transmitted by ASCII), or voice (transmitted by digital or analog).

A preamble of a POCSAG signal comprises a number of zero-to-one transitions for bit synchronization. The first word following the preamble is a sync code word which contains a predetermined binary sequence used for frame synchronization. Sixteen words of information, each comprising a selective call address and an associated message, follow before the sync code is repeated. The structure of the addresses and information may be referred to as the signalling format.

In a GSC selective call network, the receivers are divided into a plurality of groups and a twenty three bit code in the preamble selects one of the groups in addition to providing means for bit and frame synchronization. Following the preamble, a start code indicates that the preamble is finished and the information following contains selective call addresses of selective call receivers within the group and messages for those selective call receivers in a pattern of sixteen information words followed by one start code word.

However, in both POCSAG and GSC, as in other known protocols, the information contained within each message comprised only one information format. This may be inefficient, for example, when an alphanumeric (ASCII) message contains mostly numbers. The transmission time could be substantially reduced if the numbers were sent in a numeric (BCD) format.

Thus, what is needed is a selective call receiver that combines two or more received transmissions, each having different information formats, for presentation of the resultant message.

SUMMARY OF THE INVENTION

Accordingly, it is an object of the present invention to provide an improved selective call receiver.

In carrying out the above and other objects of the invention in one form, there is provided a selective call receiver comprising circuitry for receiving a first signal having a first address and a first information packet, and a second signal having a second address and a second information packet; and a device for presenting a message comprising the first and second information packets.

BRIEF DESCRIPTION OF THE DRAWINGS

FIG. 2 is a diagram of the signalling format of the present invention.

DETAILED DESCRIPTION OF THE INVENTION

Figure 1:
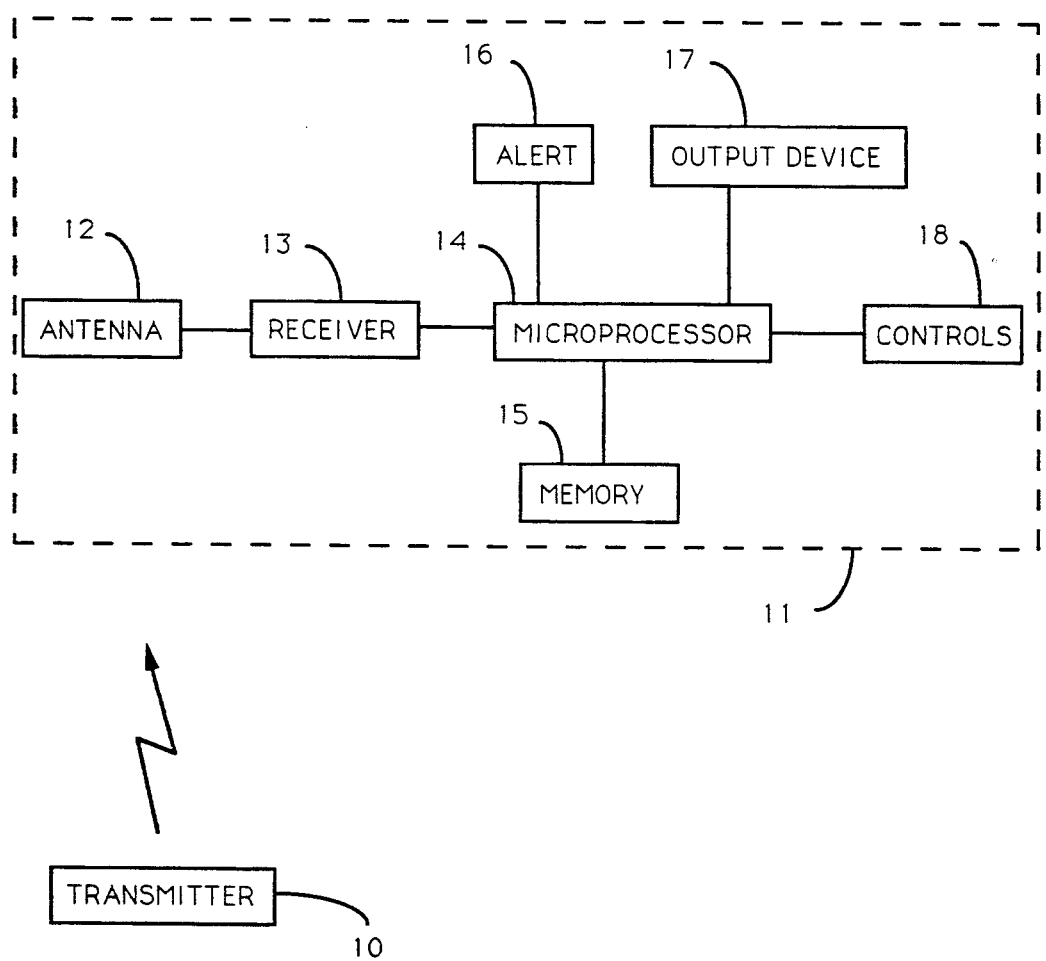
FIG. 1 is a block diagram of a conventional selective call receiver.

Referring to FIG. 1, a transmitter 10 sends signal to an electronic device 11 such as a selective call receiver including a pager which comprises an antenna 12 for receiving the signals coupled to a receiver circuit 13 which demodulates the signals received. A memory 15 is coupled to a microprocessor 14 for storing those messages containing the address of the selective call receiver 11 as determined by the microprocessor 14. The portion of the memory 15 in which the address or address are stored is generally referred to as the code plug. The microprocessor 14 also controls the storing and recalling of those messages. An alert device 16 provides an alert, i.e., audible, visual or tactile, to the user that a message has been received and is ready to be presented. An output device 17 may be a visual display for presenting the message in a numeric mode, a graphic mode or an alphanumeric mode, for example, and/or a speaker controlled by the microprocessor 14 for presenting the message in an audible mode. The controls 18 allow the user to command the microprocessor 14 to perform the selective call receiver 11 operations well known to those skilled in the art and typically include control switches such as an on/off control button, a function control, etc. For a more detailed description of the structure and operation of a selective call radio paging receiver of the type shown in FIG. 1, reference is made to U.S. Pat. No. 4,518,961, U.S. Pat. No. 4,649,538, and U.S. Pat. No. 4,755,816, all commonly assigned to the assignee of the present invention.

Referring to FIG. 2, alphanumeric, voice, numeric, and graphic signals, for example, that comprise a signalling format in accordance with the present invention, are structured so it can coexist with present selective call protocols such as GSC (Motorola's Golay Sequential Code) or POCSAG (Great Britain's Post Office Code Standardization Advisory Group) on single or multiple frequency channels. The alphanumeric signalling format comprises a preamble, a code word, an address $A_A$, a message $M_A$ and control characters $CC_1$, $CC_2$, $CC_3$, and $CC_4$. The voice, numeric, and graphic signalling formats comprise a preamble, a code word, an address $A_V$, $A_N$, and $A_G$, respectively, and a message $M_V$, $M_N$, and $M_G$, respectively. The preamble and code word for example, in POCSAG, provides bit and frame synchronization, respectively. In GSC, the preamble provides both bit and frame synchronization and the code word generally is a start code for the subsequent information. The addresses $A_A$, $A_V$, $A_N$, and $A_G$ each identify the desired selective call receiver or receivers in a manner well known to those skilled in the art. The address $A_A$, $A_V$, $A_N$, and $A_G$ inform the selective call receiver that the messages $M_A$, $M_V$, $M_N$, and $M_G$ following each address will be transmitted in ASCII and will be presented alphanumerically, in digital or analog and will be presented aurally (voice), in BCD and will be numeric, and in pixal or a data stream corresponding to FAX 1, FAX 2, FAX 3, or FAX 4 protocols, for example, and will be presented graphically, respectively. Furthermore, it is not necessary to repeat the preamble and code sequences prior to each address. For example, $A_N$ may occur after $CC_4$ and $A_G$ may occur after $M_{N2}$.

Each of the messages $M_A$, $M_V$, $M_N$, and $M_G$ may be received by the selective call receiver 11 in any order. The messages $M_V$, $M_{N1}$, $M_{N2}$ and $M_G$ with the respective control character $CC_1$, $CC_2$, $CC_3$, and $CC_4$ are stored in the memory 15. When the message $M_A$ is to be presented, the messages $M_V$, $M_{N1}$, $M_{N2}$ and $M_G$ are substituted for the control characters $CC_1$, $CC_2$, $CC_3$, and $CC_4$ in the message $M_A$.

In the example that follows, addresses 1 and 3 are alphanumeric, address 2 is voice, address 4 is numeric, and (*0) through (*7) are control characters.

ADDRESS 1 (alpha)—Dear (*0): (*1) Your payment for the bill of $(*2) for (*3) thru (*4) has not been received as of (*5). As you know, we appreciate having you as a loyal customer since (*6). Please pay your bill of $(*2) as soon as possible. (*7)

ADDRESS 2 (voice)—(*1) "A message from your paging service" (*7) "Thank you"

ADDRESS 3 (alpha)—(*0) Mr. Brown

ADDRESS 4 (numeric)—(*2) 35.15 (*3) Dec. 15, 1988 (*4) Feb. 15, 1988 (*5) Feb. 17, 1988 (*6) Jul. 19, 1979

Each of the four transmissions are received by the selective call receiver 11 and stored in the memory 15. The microprocessor 14 processes the information in the designated order for presenting the message.

When the messages are combined and presented, the visual output would appear as follows:

Dear Mr. Brown: Your payment for the bill of $35.15 for Dec. 15, 1988 thru Feb. 15, 1988 has not been received as of Feb. 17, 1988. As you known, we appreciate having you as a loyal customer since Jul. 19, 1979. Please pay your bill of $35.15 as soon as possible.

The voice messages "A message from your paging service" will be heard at the beginning of the message display and "Thank you" would be heard at the end of the message display.

In the example above, the alphanumeric and voice portions, or common portions, (addresses 1 and 2) may be sent to a plurality of selective call receivers 11 and the alphanumeric and numeric portions (addresses 3 and 4), or unique portion, would be sent to one of the plurality of selective call receivers 11 (one carried by Mr. Brown). Other voice and numeric portions may each be sent to other of the plurality of selective call receivers 11 as in the example as follows:

ADDRESS 5 (alpha)—(0) Doctor Jones

ADDRESS 6 (numeric)—(*2) 5.15 (*3) Jan. 15, 1988 (*4) Feb. 15, 1988 (*5) Feb. 17, 1988 (*6) 1965

ADDRESS 7 (alpha)—(0) Mr. Smith

ADDRESS 8 (numeric)—(*2) 42.75 (*3) Dec. 15, 1979 (*4) Feb. 15, 1988 (*5) Feb. 17, 1988 (*6) May 1987

The resultant messages received by Doctor Jones and Mr. Smith would appear as follows:

Dear Doctor Jones: Your payment for the bill of $5.15 for Jan. 15, 1988 thru Feb. 15, 1988 has not been received as of Feb. 17, 1988. As you know, we appreciate having you as a loyal customer since 1965. Please pay your bill of $5.15 as soon as possible.

Dear Mr. Smith: Your payment for the bill of $42.75 for Dec. 15, 1979 thru Feb. 15, 1988 has not been received as of Feb. 17, 1988. As you know, we appreciate having you as a loyal customer since May 1987. Please pay your bill of $42.75 as soon as possible.

Three long numeric, alpha and voice messages have been sent to three users. Each message is unique to the user, but the air time has been reduced by using a group call for a large part of each message.

It should be apparent in the embodiment illustrated, that each of the messages $M_V$, $M_N$ and $M_G$ may alternative comprise several messages in each information format, respectively, and may be interchanged in order. Furthermore, any number of information formats may be transmitted and combined within the selective call receiver 11.

We claim:

1. A selective call receiver capable of presenting a plurality of messages, comprising:
    receiver means for receiving a first signal having a first address and a first information packet including first message information, the first message information packet in accordance with a first information format, and a second signal having a second address and a second information packet including second message information, the second information packet in accordance with a second information format; and
    presentation means for presenting a message comprising at least a portion of the first information and at least a portion of the second information.

2. The selective call receiver according to claim 1 wherein the first and second information formats comprise numeric and alphanumeric information formats, respectively.

3. The selective call receiver according to claim 1 wherein the first and second information formats comprise numeric and audio information formats, respectively.

4. The selective call receiver according to claim 1 wherein the first and second information formats comprise alphanumeric and audio information formats, respectively.

5. The selective call receiver according to claim 1 wherein the first information format comprises a graphic information format.

6. The selective call receiver according to claim 1 wherein the presentation means comprises a display for visually presenting the first information packet.

7. The selective call receiver according to claim 1 wherein the presentation means comprises an audio output device for presenting the first information packet.

8. The selective call receiver according to claim 7 wherein the presentation means further comprises a display for presenting the second information packet.

9. A selective call receiver comprising:
    receiver means for receiving at least one signal, the at least one signal comprising:
        a first address;
        a second address;
        a first information packet received in accordance with a first information format associated with the first address and including a first information group having a control character associated therewith; and
        a second information packet received in accordance with a second information format associated with the second address, the second information packet including the control character and a second information group; and
    presentation means for presenting the first and second information groups, the first information group being substituted for the control character within the second information packet during the presentation thereof.

10. The selective call receiver according to claim 9 wherein the first and second information formats comprise numeric and alphanumeric outputs, respectively.

11. The selective call receiver according to claim 9 wherein the first and second information formats comprise numeric and audio outputs, respectively.

12. The selective call receiver according to claim 9 wherein the first and second information formats comprise alphanumeric and audio outputs, respectively.

13. The selective call receiver according to claim 9 wherein the first information format comprises a graphic output.

14. The selective call receiver according to claim 9 wherein the presentation means comprises a display for presenting the first information packet.

15. The selective call receiver according to claim 9 wherein the presentation means comprises an audio output device for presenting the first information packet.

16. In an electronic device, a method comprising the non-simultaneous steps of:
   transmitting a common portion of both first and second messages preceded by an address common to first and second selective call receivers;
   transmitting a first unique portion of the first message preceded by an address unique to the first selective call receiver; and
   transmitting a second unique portion of the second message preceded by an address unique to the second selective call receiver.

17. The method according to claim 16 wherein the common portion is transmitted in accordance with a first information format and the first and second unique portions are transmitted in accordance with a second information format.

18. The method according to claim 16 wherein the common portion is transmitted in accordance with a first information format, the first unique portion is transmitted in accordance with a second information format, and the second unique portion is transmitted in accordance with a third information format.

19. The method according to claim 16 wherein the common portion and the first and second unique portions are transmitted in accordance with an information format.

20. A selective call receiver comprising:
   receiver means for receiving at least one signal, the at least one signal comprising:
      a first address;
      a second address;
      a first information packet received with the first address and including a first information group having a control character associated therewith; and
      a second information packet received with the second address, the second information packet including the control character and a second information group; and
   presentation means for presenting the first and second information groups, the first information group being substituted for the control character within the second information packet during the presentation thereof.

21. The selective call receiver according to claim 20 wherein the first information packet further comprises another control character and the first information packet is substituted for the another control character during the presentation thereof.

* * * * *